July 2, 1963    D. H. LAING ETAL    3,095,892
FLUID METERING DEVICE

Filed March 22, 1960    2 Sheets-Sheet 1

INVENTORS
DAVID HARKNESS LAING
JAMES DENNIS JONES

BY R. L. Westell
PATENT AGENT

United States Patent Office 3,095,892
Patented July 2, 1963

3,095,892
FLUID METERING DEVICE
David Harkness Laing, 1509 Pembroke Drive, Oakville, Ontario, Canada, and James Dennis Jones, 60 Glenridge Ave., Willowdale, Ontario, Canada
Filed Mar. 22, 1960, Ser. No. 16,880
Claims priority, application Great Britain Mar. 24, 1959
10 Claims. (Cl. 137—101.11)

This invention relates to an apparatus for metering one fluid into another and to an apparatus for providing a fluid passage; the invention is particularly adapted for the metering of fluoride solution into a water supply.

By "fluids" we include compressible fluids such as gases and incompressible fluids such as liquids.

By "compressible container" we mean any fluid container whose volume may be decreased by external pressure on one or more walls of the container and thus we include for example, such containers as flexible plastic bags, piston cylinders or otherwise rigid containers having a diaphragm as one wall.

We use the term "sinuous" to include the meanings "helical," "winding," "crooked," "bending in and out," and "of a serpentine or undulating form."

It is an object of this invention to provide means for metering a first fluid into a second fluid, when the latter is flowing, which uses a pressure differential from a higher to a lower pressure in the second fluid, as the motivating force to move the first fluid into the second.

It is an object of this invention to provide such means wherein the proportion of the first fluid metered into the second is controlled to desirable amounts within a range of higher pressures in the second fluid when it is flowing and means are provided which are designed to keep the higher pressures below the upper limit of said range.

It is an object of this invention to provide means for metering a first fluid into a second fluid when the latter is flowing by using a pressure differential from a higher to a lower pressure in the second fluid, as the motivating force to move the first fluid into the second and wherein the proportion of the first fluid metered into the second is controlled to desirable amounts within a range of higher pressures and having means to prevent the flow of first fluid into the second when the higher pressure falls below the lower limit of said range.

It is an object of this invention to provide means for metering a first fluid into a second when the latter is flowing, by using a pressure differential from a higher to a lower pressure in the second fluid as the motivating force to move the first fluid into the second wherein the proportion of first fluid metered into the second fluid is constant over a wide range of fluid flow rates.

The invention provides a device for metering one fluid into another, which latter is flowing in a flow path, the fluid being metered being contained in a compressible container, the other fluid being provided with a fluid flow path across a flow restrictor causing a drop from a higher to a lower pressure, means for applying said higher pressure to compress said container and a restrictive path or passage from said container to the low pressure portion of said flow path whereby flow in said main line causes the metering of some of the container fluid into the main line while a cessation of flow in the main line removes the pressure differential and stops the fluid flow from the container. The invention provides designs for the flow path restrictor and the restrictive path or passage which allow flow respectively therethrough proportional to the applied pressure across them. It will be seen that the device may thus be designed to be linear, that is, to meter proportionally, from zero to maximum flow in the fluid flow path. On the other hand, it may be that such proportional metering may only be possible below a predetermined value of higher pressure in which case there may be provided on the upstream side of said flow restrictor a second restrictor for the said flow path to tend to maintain the higher pressure within the upper limit of said range. The effectiveness of the second restrictor will of course depend upon the range of source pressures for the fluid flowing in the flow path. Where the flow path fluid is water from a city water supply, the upstream restrictor will be selected to keep such higher pressures below the desired upper limit of higher pressures after considering the range of pressures to be encountered in the city supply lines.

It may be desirable, for economy of design, to provide substantially proportional metering only above a predetermined lower value of higher pressure in which case means are provided to prevent any flow of fluid from the container below such predetermined lower value.

As will be seen from the specific embodiment to follow, there are also disclosed safety arrangements whereby under conditions of no flow or reverse flow in the flow path no seepage or diffusion from the container to the flow path can take place, and no flow from the flow path to the container can take place in the event of "back pressure" in the flow path. The importance of these safety precautions will be obvious in the event that the nature of the container fluid was such that danger might accrue from greater concentrations of the container fluid in the main line than desired.

Our invention uses a fluid flow restrictor designed so that an increase in flow path fluid pressure upstream from the restrictor causes a consequential increase in rate of flow of the fluid. Such a principle permits the design of a device which will provide a flow proportional to pressure even with an incompressible fluid.

There is further disclosed a device for providing a restricted fluid path or passage formed by a pair of bodies having respective walls in immediate contact, providing at least one sinuous groove in the surfaces of one or other of the respective bodies extending along the contacting surface of said wall or in the contacting surfaces of both walls whereby a path for fluid may be defined from a fluid source connected to said at least one groove and a path for fluid may be defined from said at least one groove connected to a fluid outlet, such connections being at spaced locations.

It has been found that this method of design for a restricted fluid passage has several advantages, and in particular the following:

(1) Due to the greater length of fluid passage which may be thus conveniently provided, the required resistance to fluid flow may be achieved with a passage of relatively large cross section. The size of passage which may be used reduces the chance of clogging by fine solids and thus the liquid to go through the passage may carry such fine solids in coarser form than otherwise. This is an advantage over prior restrictive devices which comprise a porous body presenting a relatively short effective passage length and having a multitude of small passages therethrough.

Our invention allows a great length of passage to be contained in a body of very compact form and dimensions whereby the passage may be larger than the mean passage diameter of the aforesaid porous body. Thus, clogging is much less likely with our invention but the flow resistance may be made as great as with the aforesaid porous bodies.

(2) It has been found that with proper design the rate of flow to pressure relationship may be kept linear. A constant ratio between pressure drop across the device and fluid flow therethrough may be achieved when the groove cross section and length are such as to cause laminar flow within the range of pressures applied.

(3) The construction described has been found to lend itself readily to plastic molding techniques.

(4) The sinuous passage construction allows the design of a restrictive passage of considerable length to be provided in a member of much shorter length.

Preferably, the device is constructed of a body having at least one surface defining a large central bore therein and a body having a surface adapted to make a sliding fit in the bore, and to rest against the defining surface. The groove is preferably made in helical form and is made in one of the surfaces so that when the second member is placed inside the first, a passage is defined therebetween.

This design permits examination or easy cleaning of the interior surfaces of the grooves so formed by removal of the second body to lay bare the first body bore.

The device just described is particularly adapted for metering quantities of one fluid of one order into quantities of fluid of a much higher order.

It will be seen that the device would be of value for individual fluoridation of the water supply to a dwelling house or to an individual water outlet or the like and it is this construction that is described in the specific embodiment.

Fluoridation requires the introduction of very small quantities of fluoride solution into a water supply in proportions which must be carefully controlled due to the harmful effects of over-concentration of such fluoride in the water supply. The device to be described is particularly adapted to control the supply of such fluoride solution.

Figure 1:
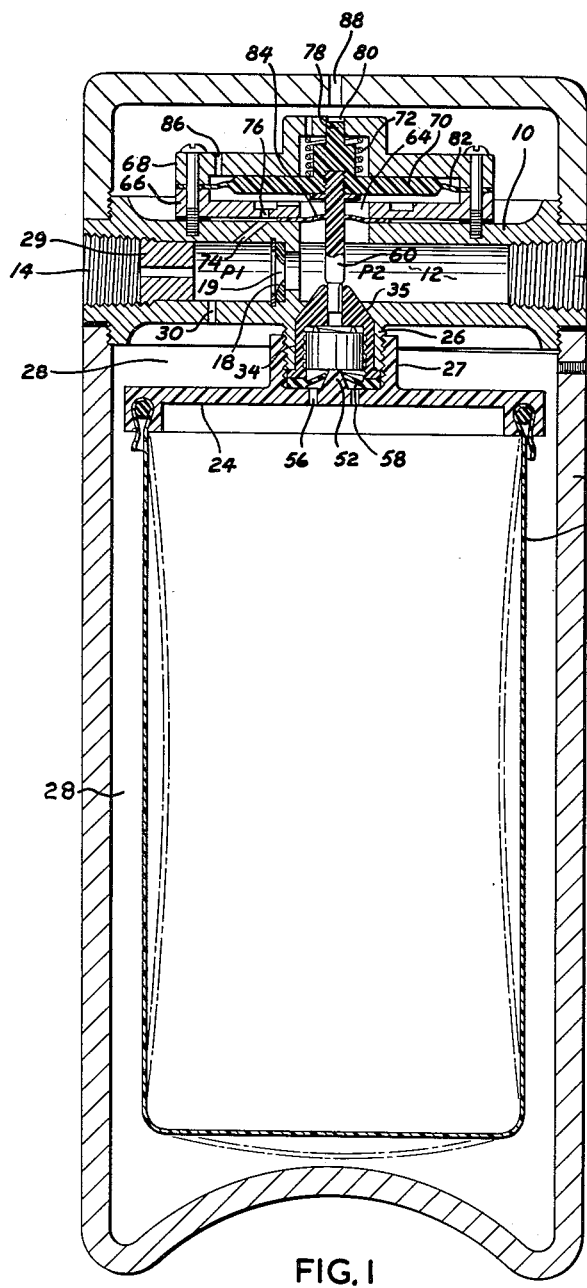
FIGURE 1 is a vertical cross-section through the device.

In the drawing is shown the fluid metering device comprising a body 10 having a central bore 12 therein. At each end of bore 12 the defining walls thereof are threaded for attachment to a water line and the bore therefore defines a flow direction and an upstream end 14 and a downstream end 16. The bore 12 is sometimes referred to as a "flow path" or a "main flow path" and the fluid flowing therein is sometimes referred to as the second fluid. It will be understood that a suitable screen may be placed in the main flow path on the upstream side of body 10 to prevent large objects approaching the body.

Toward the upstream end 14 of the bore is provided a flow restrictor 18 adapted to form a resistance to flow in the bore 12 hereinafter also referred to as the main flow path. The restrictor 18 causes a material pressure drop P1—P2 between the pressure P1 on the upstream side of the restrictor and the pressure P2, on the downstream side. The pressure P1 is referred to herein as the "higher pressure" and the pressure P2 as the "lower pressure."

Figure 4:
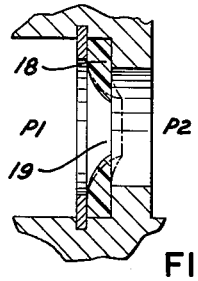
FIGURE 4 is an enlarged view of another part of FIGURE 1.

The flow restrictor 18 illustrated in FIGURE 4, is designed to allow quantity of flow per unit time to flow therethrough at a rate proportional to the pressure differential across the restrictor. The restrictor may be of any desired design to allow such proportional flow but in its preferred form is an annular disc of flexible stretchable resilient material, such as rubber having a central aperture 19. The restrictor 18 is preferably anchored against longitudinal movement along bore 12 in the downstream direction by any desired means such as by a shoulder resting in a groove in bore 12. The restrictor 18 is designed so that the pressure of fluid flowing in bore 12 flexes the material of the disc about aperture 19, downstream relative to the periphery and is designed so that such flexure widens aperture 19 so that with proper design the rate of flow of fluid in quantity per unit time (hereinafter referred to as the "flow rate") through aperture 19 will be proportional to the pressure differential across the restrictor 18. In the preferred embodiment such design is accomplished by ensuring that the upstream face of the disc, adjacent the aperture 19 slopes in a downstream direction toward the aperture to meet the downstream face of the disc at the edge thereof defining aperture 19. The slope of the upstream face is such that downstream flexure of the inner edge thereof (FIGURE 4) will expand the effective aperture 19 in progressive degrees varying with the pressure differential across the disc. The operation of the restrictor 18 is that pressure P1 on the upstream side thereof, flexes the inner extent of restrictor 18 in the downstream direction tending to increase the size of aperture 19 in accord with the higher pressure P1. In this way the characteristics of restrictor 18 may be so designed that the flow through the aperture is proportional to the pressure differential P1—P2. The design will in some cases be assisted by the fact that the upstream side of restrictor 18 is curved inwardly in the direction of fluid flow.

Below the main bore 12 is provided a fluid tight housing 20, preferably of cylindrical form. In the housing is contained a flexible fluid tight container or bag 22. Fluid in bag 22 is sometimes referred to as the second fluid. The bag 22 is detachably suspended by any desired means from a holder 24 which forms the top of the bag 22. The holder is provided with an internally threaded sleeve 27 for attaching the holder to a boss 26 projecting downwardly from the body 10, and the dimensions of holder 24 and bag 22 are such that there is a space 28 between the housing and the side and bottom walls of the bag 22. Means are provided for evacuating air from the space 28 through housing 20 such as bleed screw 21.

Figure 5:
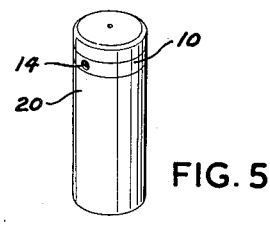
FIGURE 5 is a reduced perspective view of the outside of the device.

In a preferred form of the invention body 10 is a thick disc, circular in plan view (please refer to FIGURE 5 as well as FIGURE 1) with bore 12 extending diametrically thereacross. As shown, the housing 20 may be threaded onto the body 10. When used as a fluoridator for a dwelling house, it is important that the housing be readily detachable for easy replacement of the bag 22. However it is sometimes felt that threaded joints are not desirable because of the risk of damage to the thread. If this is so the housing may conveniently be attached to the body by flanges and bolts or by any other easily detachable means.

A bore 30 connects bore 12 on the upstream side of the restrictor 18 with the space 28 the junction between the housing 20 and body 10 making the space 28 otherwise fluid tight. The housing 20 and body 10 may be threaded together as shown, with a suitable sealing washer therebetween.

Means are provided for connecting the inside of bag 22 with bore 12 on the downstream side of the restrictor 18 which will now be described.

The boss 26 is provided with a central bore 34 extending from the bottom thereof to the bore 12 on the downstream side of restrictor 18. Bore 34 is of wide diameter in its lower portion but tapers toward bore 12 at 35 and preferably the defining surface thereof is a surface of revolution. Adapted to slide upwardly into the bore 34 is plug 36 having a surface complementary to and adapted to be placed in juxtaposition with the defining surface of bore 34. Plug 36 has shoulder flanges 38 adapted to bear on the lower surface of the boss 26. In such position complementary upper tapering walls 37 of the plug abut the tapering walls of the bore 34 but extend upwardly for a short distance into the bore 12.

The tapering portion of plug 36 is provided with a bore 39 opening into the bore 12 and the bore 39 is connected at its lower end to a cylindrical chamber 40 defined by top wall 41 and side walls 42. The walls 42 are provided with one or more helical grooves 44 extending like threading from the bottom to top of side walls 42. The grooves 44 are of predetermined cross section for a purpose to be hereinafter described. Adapted to fit in the chamber defined by walls 41 and 42 is a block 46. The block 46 is shaped to abut with a tight fit the walls 42 and is provided with studs 48 on the upper surface thereof adapted to contact top walls 41 and provide a space between the upper surface of the block and the top wall of the chamber to allow flow between grooves 44 and bore 39. The abutment between the surfaces of block 46 and the surfaces of walls 42 must be "immediate," that is the "fit" must be such that there can be no leakage between them out of grooves 44.

The outer surface of the boss 26 is threaded and the sleeve 27 is screwed over the top thereof. The holder 24 on the upper surface inside sleeve 27 is provided with a central stud 52 adapted to contact the bottom wall of the block 46 and hold it so that studs 48 contact the upper wall of the chamber 40. An annular washer 54 is seated on the upper surface of holder 24 and seats the lower surface of the tapered plug to hold the latter in place in the bore 34. Ports 56 extend through the holder 24 inside sleeve 27 at a portion of the upper surface thereof uncovered by the washer 54.

A membrane 58 extends conically from the washer 54 to the stud 52 and is tensioned lightly downwardly against the stud. The membrane 58 is so tensioned as to be easily moved upwardly by a greater pressure below the membrane than above but to seal off the bag 22 against upward diffusion of the materials therein when no pressure differential exists. It will be noted that membrane 58 is also adapted to prevent flow into the container 22 in the event of "back pressure" and hence acts as a one way valve. The membrane 58 and washer 54 are preferably of plastic and are contiguous and formed in a single moulding operation.

The proportional restrictor 18 and the restricted fluid passage or path composed of the grooves 44 may be treated as parallel resistances to fluid flow, both acted upon by the pressure differential P1—P2 and with proper design causing an amount of fluid from container 22 to flow into the main flow path in a constant proportion over the range of values of the pressure differential. Although this is theoretically possible, in practice it will often be found advantageous to reduce the design requirement on the restrictors 18 and 44 for constant proportion by limiting the maximum value of P1. This is done by placing the restrictor 29 in series with parallel restrictors 18 and 44 and on the upstream side thereof.

The restrictor 29 is designed to present a narrow rigid aperture to the fluid flowing into the main flow path and is particularly designed for incompressible fluids. With an incompressible fluid, and this restrictor, the higher the pressure upstream from restrictor 29, the greater the pressure drop across the restrictor. Restrictor 29 therefore acts as a limiter for pressure P1. It is of course true that as the pressure upstream from restrictor 29 rises, the pressure P1 will also rise. However, if the fluid flowing in the main flow path is water, and the source of water is a municipal water supply, the peak pressures for such supply will usually be known. For such peak pressures, the restrictor 29 may be selected to ensure that up to such peak pressures P1 is within the design range for proportional metering.

It will be obvious that other means may be provided for limiting P1 below a maximum value in spite of source pressure variations whether the fluid flowing in the fluid flow path is incompressible or compressible.

The restricted fluid passage or path composed of the grooves 44 will allow flow therethrough in amounts which are linearly proportional to the pressure differential across the passage as long as the flow through the grooves 44 is laminar. This proportionality results from the fact that the fluid flow resistance in grooves 44 is substantially all due to friction of the fluid on the passage walls resulting in shear in the fluid causing flow rate substantially proportional to pressure drop across the passage in accord with Poiseuille's law and is therefore substantially proportional to the pressure differential across the passage. The most critical dimension for laminar flow is the diameter, and the larger the diameter the greater the laminar volume flow rate which may be obtained through the passage.

For a given restrictor 18 pressure P2 and the differential P1—P2 is a function of P1. Thus by the use of a relatively large diameter groove 44, flow therethrough linearly proportional to the pressure differential across the groove is possible to a relatively high range of higher pressures P1. For a relatively large groove 44 the required resistance to fluid flow is obtained by increasing the length of the groove. The helical design of groove 44 shown, or a groove of other sinuous shape allows the desired length of path to be achieved within a compact body which may be plug 36 and block 46 as shown, or may be other differently shaped bodies having immediately contacting surfaces in one or both of which the sinuous grooves may be located.

The use of a grooved surface of one member juxtaposed to a surface of another member provides a fluid passage which may be designed cheaply and accurately since the grooved member may be cheaply and accurately moulded out of plastic and thereafter easily cleaned if necessary. The tolerances of groove diameter which are of great importance in determining flow rate are of somewhat less effect with the disclosed construction because of the larger groove diameter. The juxtaposed surfaces must fit together so accurately as to prevent any substantial leakage from the groove between the surfaces.

Figure 2:
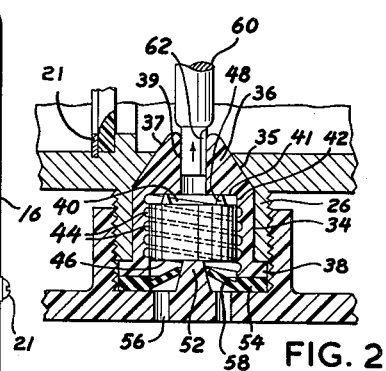
FIGURE 2 is an enlarged view of a part of FIGURE 1.
Figure 3:
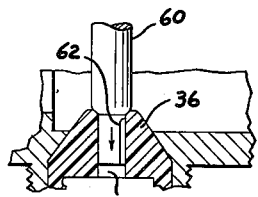
FIGURE 3 is an enlarged view of a part of FIGURE 1 showing an element of the apparatus in a different position to that shown in FIGURE 2.

The valve design to be hereinafter described prevents flow of fluid from the container 22 when the flow is so low as to place the pressure differential below the linear range of design. For operation of the valve refer to FIGURES 1, 2 and 3.

A valve spindle 60 extends downwardly into the plug aperture and the part therein is of a diameter to close the aperture 39. A groove 62 extends a short extent upwardly from the bottom of the spindle on the side thereof adjacent the downstream end 16 of the bore. The spindle is adapted to reciprocate vertically over a limited range of movement and the length of the groove 62 is so related thereto that the upper end is exposed above the plugs 37 at the upper limit of movement of the spindle 60 but occluded at the lower extremity of movement.

The spindle projects upwardly through an aperture 64 in the body 10.

A piston cylinder is defined by a pair of opposed flanged members 66 and 68 over aperture 64 and the spindle 60 projects into the cylinder having threaded thereon a piston 70. On the upper side of the piston 70 a compression spring 72 bearing against it biases the piston downward. Fluid inlet at pressure P1 is provided for by passages 74 and 76 in members 10 and 66 respectively. Alignment of the spindle 60 during reciprocal movement is assured by a stud 78 projecting upwardly from piston 70 into a bore 80 in member 68.

A fluid tight seal between piston 70 and the cylinder walls is assured by membranes 82 projecting on each side thereof and clamped between the members 66 and 68. The piston 70 and membranes 82 are preferably of plastic and may therefore be integrally made with one another.

Fluid entry through bore 64 is prevented by a similar membrane 84 clamped between member 66 and body 10 and preferably of plastic and integral with spindle 60. Suitable ports 86 and 88 prevent compression in the spaces above piston 70.

For the purpose of operation, let it be assumed that the upstream end of bore 12 is connected to a water line on the downstream side of a valve which controls flow in the main flow path and that the container 22 is filled with fluoride solution. Then when the valve is opened causing flow in bore 12 water flows through restrictor 29 and then through restrictor 18 and out through downstream end 16. The flow of water through restrictor 18 creates the pressure differential P1—P2 while restrictor 29 limits the upper value of P1. Simultaneously water at pressure P1 flows through port 30 to space 28 to apply pressure P1 to the container 22. At the same time water flowing through ports 74 and 76 raises the piston 70 and with it spindle 60. Groove 62 is then exposed to main flow bore 12 (see FIGURE 2 and FIGURE 1). The container 22 is then (with the exception of the valve formed by membrane 58 which is closed) directly connected by ports 56, grooves 44 and groove 62 to the bore 12 on the downflow side of restrictor 19. The pressure differential P1—P2 acting through bag 22 and between the inside of container 22 through groove 44 to the main flow path on the downstream side of restrictor 18 thus causes membrane valves 58 to lift, and flow of the fluoride solution takes place from container 22 through grooves 44 to bore 12 and into the main flow.

As previously explained, the proper design of grooves 44 and restrictor 18 allows the ratio of fluoride solution to water to be kept substantially constant over the main range of values of the pressure differential. To keep the values of the pressure differential within the range of linear operation of grooves 44 and restrictor 18 a non-linear restrictor 29 may be provided. The restrictor 29 reduces the pressure P1 below that of the line and due to the non-linearity of the restrictor the amount of reduction increases with increasing line pressures.

The restrictor 29 will not limit higher pressure P1 to the linear range for all line pressures. However the line pressures in a given municipality will usually have predetermined peak values and thus, for such municipality the characteristics of the restrictor 29 may be selected to keep higher pressure P1 below the maximum value for linear operation even at such peak values.

The flow of fluoride solution is prevented at low values of the pressure differential by the fact that the pressure P1 is insufficient to open groove 62 to the main flow against the bias of compression spring 72.

When pressure P1 drops toward zero there is no pressure differential across the restrictor 18 and no pressure on container 22. The spring 72 acts to move spindle 60 downwardly, occluding groove 62 from the main flow and membrane valve 58 closes on plug 52. It will be seen that in valve piston 70 the pressure P1 is opposed, not only by the spring 72 but also by the atmospheric pressure. However the variations of atmospheric pressure are so small in relation to the pressure P1 on the one hand and the spring 72 on the other hand that they do not introduce any noticeable error in the functioning of the valve.

It will thus be seen that two main barriers prevent the diffusion of fluoride solution out of container 22 and into main flow 12 when the main flow line valve is shut off; firstly, the membrane valve 58 and secondly, the occlusion of groove 62. With the main flow line valve located upstream from the inventive device it will be obvious that the valve operated by spindle 60 for allowing or preventing flow from the container could be operated by P2 instead of P1 as shown since for any given restrictor 18, P2 and P2—P1 are functions of P1, and as P1 varies so P2 will vary although in lesser amounts.

Figure 6:
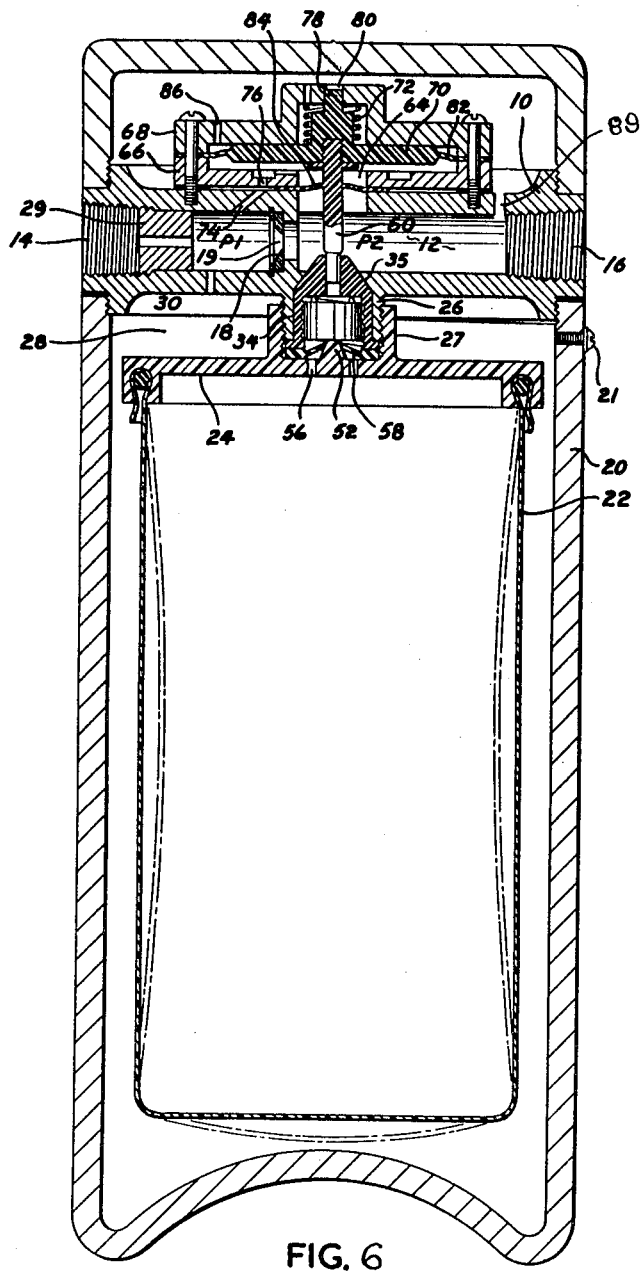
FIGURE 6 shows a slight modification of the device in FIGURE 1.

When the inventive device is located on the upstream side of the valve for controlling flow in the main flow path, then it will be seen that when the flow is shut off, pressures P1 and P2 will be full line pressures and the valve controlling flow from container 22 to the main flow path would not shut to prevent such flow. Thus when the main flow path valve is located downstream from the device, the effect of pressure P1 is applied against the valve bias force and P2 is caused to exert an effect opposite to P1 on the valve control, so that in a device as shown in the alternative embodiment of FIGURE 6, when the main flow valve is shut off the effect of P2 (P2 then equalling P1) plus the valve bias force will be sufficient to move the valve against the effect of P1 to prevent flow in the restricted passage from the container. This alternative form of the device is shown in FIGURE 6 and it will be seen that the only change from FIGURE 1 is the elimination of the passage 88 which, in FIGURE 1 connected the upper surface of piston 70 (through passage 86) to the atmosphere and the addition of a passage 89 which instead connects the upper surface of piston 70 (through passage 86) to conduit 12 in the location of downstream pressure P2. Whether the device is as shown in FIGURE 1 or in FIGURE 6 it will be seen that the valve mechanism will operate to interrupt flow from the container whenever the pressure differential across the restrictor 18 falls below a predetermined amount.

The positioning of groove 62 on the downflow side of spindle 60 prevents the accidental clogging of groove 62 by foreign matter or deposits from the main flow.

Finally it should be noted that between maximum and minimum values of higher pressure P1 the restricted passage embodied by groove 44 will meter fluid from the container into the main flow path at rates linearly proportional to the differential P1—P2. For predetermined line pressure peaks the restrictor 29 will keep the value of P1 below the maximum.

In some fields, not specifically discussed heretofore, a pressure drop of a second fluid flowing in a main flow path may be used to move fluid from a container to the main flow path by causing second fluid to move from a higher pressure part of the flow path into the first fluid container itself forcing first fluid into the flow path at a lower pressure part. Thus the bag 22 separating first fluid from second fluid may in such fields be eliminated. It will be seen that, in this case also, the sinuous groove from the container to the flow path and the flexible disc 19 may be used to obtain metering of some accuracy.

We claim:
1. Means for metering a first fluid into a second fluid, comprising: a conduit defining a fluid flow path; a predetermined fluid flow direction in said conduit; means for restricting flow of fluid along said conduit adapted to cause a pressure differential thereacross from a higher pressure on the upstream side of said flow restricting means to a lower pressure on the downstream side of said flow restricting means, said flow restricting means being designed to allow fluid flow therepast at a volume flow rate substantially linearly proportional to said pressure differential within a predetermined range of said pressure differential; a compressible container for said first fluid; means for applying said higher pressure to the outside of said compressible container; means defining a fluid passage connecting the inside of said compressible container to said main flow line in the region of said lower pressure; said fluid passage being designed to have laminar flow of said first fluid over said predetermined range of pressure differentials.

2. Means as claimed in claim 1 wherein said fluid passage comprises a pair of bodies having respective surfaces in contact, at least one sinuous groove in one of said surfaces; means connecting one end of said groove to said container and means connecting the other end of said groove to a part of said flow path on the lower pressure side of said flow restricting means, the diameter and length of said at least one groove being such as to provide for laminar flow of said first fluid under pressure differentials between said minimum and maximum values.

3. Means as claimed in claim 1 wherein said fluid passage is connected at one end to the inside of said container and at the other end to a part of said flow path on the lower pressure side of said restrictor said passage being sinuous in form.

4. Means as claimed in claim 1 in combination with means, responsive to pressure differentials lower than said predetermined range to prevent flow of fluid along said fluid passage, and responsive to pressure differentials higher than the lower limit of said predetermined range to allow flow of fluid along said fluid passage.

5. Means as claimed in claim 1 in combination with means for supplying fluid along said conduit at pressures less than those which will create pressure differentials above the upper limit of said range; and means, responsive to a drop in pressure differentials from values higher to values lower than the lower limit of said predetermined range, to prevent flow of fluid along said fluid passage, and responsive to a rise in pressure differentials from values lower to values higher than the lower limit of said predetermined range, to allow flow of fluid along said fluid passage.

6. Means for metering a first liquid into a second liquid, comprising: a conduit defining the second liquid flow path; a predetermined liquid flow direction in said conduit; means for restricting flow of liquid along said conduit adapted to cause a pressure differential thereacross from a higher pressure on the upstream side of said flow restricting means to a lower pressure on the downstream side of said flow restricting means, said flow restricting means being designed to allow liquid flow therepast at a volume flow rate substantially linearly proportional to said pressure differential within a predetermined range of pressure differentials; a compressible container for said first liquid; means for applying said higher pressure to the outside of said compressible container; means defining a liquid passage connecting the inside of said compressible container to said second liquid flow path in the region of said lower pressure; said connecting conduit being designed to produce laminar flow of said first liquid over said predetermined range of pressure differentials; wherein said flow restricting means comprises a body of flexible, stretchable, resilient material extending across said flow path, said body being annular in form and defining an aperture, and the upstream and downstream walls of said body tapering inwardly to an edge defining said aperture, the curvature of said aperture defining edge, when viewed in the direction of flow, being always in the same sense, said body being constructed and designed so that the pressure differential in said flow path caused by said restrictor, acts to flex the material adjacent said aperture in a downstream direction and whereby said flexure widens said aperture.

7. Means as claimed in claim 6 wherein said liquid passage defining means comprises a pair of bodies having mutually contacting surfaces, at least one sinuous groove in one of said surfaces, a fluid connection from said container to said groove and a fluid connection from said lower pressure portion of said flow path to said groove, said groove connections being spaced along said groove.

8. Means for metering a first fluid into a second fluid, comprising: means defining a flow path and flow direction for said second fluid; means defining a first restrictor in said flow path, whereby with flow in said flow path there is a pressure differential from a higher pressure to a lower pressure across said restrictor; a compressible container containing said first fluid; means for applying said higher pressure to the outside of said compressible container; a restricted fluid connection from said container to said flow path at a location therein on the lower pressure side of said first restrictor, whereby flow of said second fluid in said main line causes said pressure differential, whereby said higher pressure acts to compress said container and move first fluid through said restricted fluid connection to said flow path; said restricted fluid connection including a straight bore opening into said flow path in a part at said lower pressure; a spindle slidable in said bore and making a sliding fit therewith; a groove running longitudinally along said spindle from the conduit remote end to a location short of the conduit adjacent end thereof; means for moving said spindle between a position where said groove is exposed to said conduit and a position where said groove is totally contained in said bore; means for controlling the movement of said spindle to cause it to assume groove-exposed position when the pressure differential at said first restrictor is above a predetermined value, and to cause said spindle to assume a position so that said groove is totally contained in said bore when said pressure differential is below a predetermined value.

9. Means for metering a first liquid into a second liquid, comprising: a conduit defining the second liquid flow path; a predetermined liquid flow direction in said conduit; means for restricting flow of liquid along said conduit adapted to cause a pressure differential thereacross from a higher pressure on the upstream side of said flow restricting means to a lower pressure on the downstream side of said flow restricting means, said flow restricting means being designed to allow liquid flow therepast at a volume flow rate substantially linearly proportional to said pressure differential within a predetermined range of pressure differentials; a compressible container for said first liquid; means for applying said higher pressure to the outside of said compressible container; means defining a liquid passage connecting the inside of said compressible container to said conduit in the region of said lower pressure; said means defining a liquid passage being designed and constructed to define a passage of a length and cross-sectional area which will produce laminar flow in liquid passing through said passage during the existence of pressure differentials within said range.

10. Means for metering a first fluid into a second fluid, comprising: a conduit defining a fluid flow path; a predetermined fluid flow direction in said conduit; means for restricting flow of fluid along said conduit adapted to cause a pressure differential thereacross from a higher pressure on the upstream side of said flow restricting means to a lower pressure on the downstream side of said flow restricting means, said flow restricting means being designed to allow fluid flow therepast at a volume flow rate substantially linearly proportional to said pressure differential within a predetermined range of said pressure differentials; a compressible container for said first fluid; means for applying said higher pressure to the outside of said compressible container; means defining a fluid passage connecting the inside of said compressible container to said main flow line in the region of said lower pressure; said fluid passage being designed to have laminar flow of said first fluid over said predetermined range of pressure differentials; and having means for limiting said higher pressure to a predetermined upper limit and means for preventing flow of fluid along said fluid passage when said pressure differential is below said predetermined range.

References Cited in the file of this patent
UNITED STATES PATENTS

| | | |
|---|---|---|
| 1,812,916 | Zerk | July 7, 1931 |
| 2,061,949 | Monroe | Nov. 24, 1936 |
| 2,516,096 | Tornblom | July 18, 1950 |
| 2,573,299 | Bast | Oct. 30, 1951 |
| 2,593,315 | Kraft | Apr. 15, 1952 |
| 2,618,510 | Mills | Nov. 18, 1952 |
| 2,671,691 | Schnell | Mar. 9, 1954 |
| 2,714,963 | Lester | Aug. 9, 1955 |
| 2,775,984 | Dahl | Jan. 1, 1957 |
| 2,865,388 | Sternbergh | Dec. 23, 1958 |
| 2,932,317 | Klosse | Apr. 12, 1960 |
| 2,984,250 | Foster | May 16, 1961 |
| 3,025,876 | Wolfe | Mar. 20, 1962 |
| 3,040,774 | Stenberg | June 26, 1962 |

FOREIGN PATENTS

| | | |
|---|---|---|
| 701,460 | Great Britain | Dec. 23, 1953 |